United States Patent
Koppauer et al.

(10) Patent No.: US 11,148,334 B2
(45) Date of Patent: Oct. 19, 2021

(54) METHOD FOR ESTABLISHING A TARGET VALUE

(71) Applicant: ENGEL AUSTRIA GmbH, Schwertberg (AT)

(72) Inventors: Herwig Koppauer, Linz (AT); Georg Pillwein, Linz (AT); Klemens Springer, Leonding (AT); Friedrich Johannes Kilian, Neuhofen (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 0 days.

(21) Appl. No.: 17/070,424

(22) Filed: Oct. 14, 2020

(65) Prior Publication Data

US 2021/0107196 A1   Apr. 15, 2021

(30) Foreign Application Priority Data

Oct. 15, 2019   (AT) .............................. A 50884/2019

(51) Int. Cl.
  *G05B 13/00*   (2006.01)
  *B29C 45/76*   (2006.01)
  *G05B 19/401*  (2006.01)

(52) U.S. Cl.
  CPC ............ *B29C 45/766* (2013.01); *G05B 13/00* (2013.01); *G05B 19/401* (2013.01); *B29C 2945/76933* (2013.01); *B29C 2945/76936* (2013.01); *B29C 2945/76949* (2013.01)

(58) Field of Classification Search
  None
  See application file for complete search history.

(56) References Cited

U.S. PATENT DOCUMENTS

| 5,578,256 A | 11/1996 | Austin |
| 5,595,693 A | 1/1997 | Fujita et al. |
| 10,981,316 B2 | 4/2021 | Hoeglinger |
| 11,000,982 B2 | 5/2021 | Stoehr et al. |

(Continued)

FOREIGN PATENT DOCUMENTS

| CN | 104608351 A | 5/2015 |
| CN | 107953525 A | 4/2018 |

(Continued)

*Primary Examiner* — Jacob T Minskey
*Assistant Examiner* — Adrien J Bernard
(74) *Attorney, Agent, or Firm* — Wenderoth, Lind & Ponack, L.L.P.

(57) ABSTRACT

A target value progression for a process parameter functioning as a setting variable is established so that an actual value progression for a selected variable has a desired property, or the desired actual value progression itself ensues. The actual value progression occurring in relation to the first configuration is predetermined as a reference value progression for the selected variable, and a target value progression for the process parameter functioning as the setting variable is established by a computer so that the reference value progression as the actual value progression with the desired property or the desired actual value progression itself ensues when the shaping machine in the second configuration operates in a production cycle in accordance with the selected target value progression for the at least one process parameter functioning as the setting variable.

24 Claims, 3 Drawing Sheets

(56) References Cited

U.S. PATENT DOCUMENTS

| | | | | |
|---|---|---|---|---|
| 2010/0065979 A1* | 3/2010 | Betsche | ............... | B29C 48/92 |
| | | | | 264/40.6 |
| 2013/0173074 A1* | 7/2013 | Chandler | ............... | G05B 19/05 |
| | | | | 700/287 |
| 2018/0104875 A1 | 4/2018 | Hoeglinger | | |
| 2018/0117816 A1 | 5/2018 | Mensler et al. | | |
| 2018/0178430 A1 | 6/2018 | Stoehr et al. | | |
| 2018/0181694 A1 | 6/2018 | Springer et al. | | |

FOREIGN PATENT DOCUMENTS

| | | |
|---|---|---|
| CN | 108237669 A | 7/2018 |
| CN | 108237670 A | 7/2018 |
| DE | 691 26 700 | 1/1998 |
| DE | 44 46 857 | 7/2004 |
| DE | 10 2015 107 024 | 7/2016 |
| DE | 10 2017 131 032 | 6/2018 |
| EP | 3546179 A1 | 10/2019 |
| JP | 2019-107784 A | 7/2019 |
| TW | 201706112 A | 2/2017 |
| WO | 91/14562 | 10/1991 |

* cited by examiner

METHOD FOR ESTABLISHING A TARGET VALUE

BACKGROUND OF THE INVENTION

Shaping machines have a large number of measurable variables, the progression of which (hereinafter referred to for brevity as: "actual value progression") for various reasons is either to follow a desired profile relatively accurately or however is to have at least desired properties, like for example the avoidance of excessively pronounced peaks. To be able to achieve a desired actual value progression (that is to say a given actual value progression itself or an actual value progression with at least one desired property) a suitable target value progression has to be established for at least one process parameter functioning as a setting variable. The choice of a suitable target value progression is a time-consuming and laborious matter even for an experienced user of a shaping machine of the general kind set forth, while for an inexperienced user it is simply impossible.

The difficulty is that in fact by virtue of the complexity of the physical relationships it is not immediately clear to a user of the shaping machine, how a target value progression has to be established for a process parameter functioning as a setting variable in order to achieve a given property in respect of the actual value progression for a variable, in particular for a variable different from the process parameter functioning as a setting variable, although those physical relationships are naturally known to the designers of the shaping machine (by virtue of expert knowledge, practical tests or calculations and simulations). That is frequently also made difficult by virtue of the fact that the dependencies of target value progression and actual value progression are to be predetermined or apply in relation to various physical parameters, for example positional dependency in respect of the target value progression and a time dependency in respect of the actual value progression.

In a shaping machine of the general kind set forth in the form of a plastic injection moulding machine, it may be necessary for example to achieve a given time-dependent profile for the injection pressure (pressure with which the plastic melt is injected into the moulding tool) (actual value progression). For that purpose it is possible to select as the setting variable an injection speed which is usually to be specified in dependence on a position of the injection ram (target value progression). It is not immediately clear to the user of the shaping machine how he is to establish the injection speed in dependence on the position of the injection ram so that the desired progression of the injection pressure in relation to time is afforded.

Similar difficulties arise in determining the switchover point (the position of the injection ram at which the arrangement has to switch over from open-loop or closed-loop speed control to pressure closed-loop control because the moulding tool is volumetrically filled) and for determining a desired holding pressure (pressure which is to be applied to the plastic melt after volumetric filling of the mould so as to avoid the occurrence of shrink marks on the moulding due to cooling and shrinkage).

If the situation involves fitting a new moulding tool on the same machine or the same tool on another machine the procedure has to be repeated by the user, even if the user has already carried out the procedure for that mould tool in relation to another shaping machine as it is not possible to assume that the shaping machines are identical or it is anyway clear that the shaping machines involve a different structure because for example they have drive units of a different design conception or come from different manufacturers.

DE 10 2015 107 024 B3, for a cyclically operating shaping machine in the form of a plastic injection moulding machine, describes adaptation of a simulation result to a real test cycle on the basis of identification of a pattern of singular measurement events.

WO 91/14562 A1 is concerned with a method of optimising a ram speed of a plasticising unit of a cyclically operating shaping machine in the form of a plastic injection moulding machine, to the effect that a desired melt flow through an injection nozzle of the plasticising unit is achieved.

In that case, that specification involves a target profile for the melt flow, which is based on a simulation of the tool and the melt flow in the tool. There is however a discrepancy between the predetermined target profile and the melt flow which occurs in a real injection moulding machine because the behaviour of that injection moulding machine in which the tool will be mounted is not known when implementing the simulation of the tool. This now involves ascertaining the behaviour, which prima facie is not known, of the injection moulding machine—insofar as it influences the melt flow, namely in particular the melt cushion in front of the screw acting as the ram—(see page 9, lines 24 to 31 of WO 91/14562 A1).

For that purpose a sensor arranged in the injection nozzle measures an "actual melt flow $dP_{act}/dt$" and compares it to a "reference melt flow $dP_r/dt$" stored in a control means. From a difference between those two flows the control means calculates a "compensated ram speed $dx_{ram}/dt$" and uses that for actuating the ram in a further injection operation. That procedure is repeated until there is an optimum ram speed. Therefore a target value progression and an actual value progression of the same magnitude are compared together and the target value progression is optimised until there is an actual value progression with a desired property.

A method having the features of the classifying portion of claim 1 is shown in DE 44 46 857 B4.

SUMMARY OF THE INVENTION

The object of the invention is to provide a method of the general kind set forth for establishing a target value progression and a method of the general kind set forth for open-loop or closed-loop control of a cyclically operating shaping machine and a shaping machine of the general kind set forth, with which it is more easily possible to achieve a desired actual value progression when using an identical or the same moulding tool in different shaping machines and to provide computer program products in that connection.

In a method according to the invention of establishing a target value progression for at least one process parameter functioning as a setting variable of a production cycle of a cyclically operating shaping machine, in which an actual value progression is afforded for at least one variable different from the process parameter functioning as the setting variable when the shaping machine operates in a production cycle in accordance with the target value progression for the at least one process parameter functioning as the setting variable it is provided that at least one desired property of the actual value progression or a desired actual value progression itself (possibly to a desired maximum degree of approximation) is predetermined for at least one selected variable and a target value progression for the at least one process parameter functioning as the setting variable is so established by a computer that—possibly within a predeterminable or predetermined tolerance range—an actual value progression for the at least one selected variable with the at least one selected property or the selected actual value progression itself ensues.

The individual steps of the method according to the invention can be carried out either within a single production cycle, preferably in real time, or the individual steps of the method can be carried out in different production cycles (not necessarily but possibly directly following each other).

In the invention at least the following steps are provided:
A. with a shaping machine in a first configuration in at least one production cycle the target value progression for the at least one process parameter functioning as the setting variable is so established that an actual value progression for the at least one selected variable has the desired property or the desired actual value progression itself ensues,
B. in a shaping machine in a second configuration different from the first configuration the actual value progression occurring in relation to the first configuration is predetermined as a reference value progression for the at least one selected variable and a target value progression for the at least one process parameter functioning as the setting variable is so established by the computer that—possibly within a predeterminable or predetermined tolerance range—the reference value progression ensues as the actual value progression with the desired at least one property or the desired actual value configuration itself when the shaping machine in the second configuration operates in a production cycle in accordance with the selected target value progression for the at least one process parameter functioning as the setting variable.

The invention provides a computer program including commands which in the execution of the program by a computer cause same to carry out such a method according to the invention of establishing a target value progression.

The invention also provides a computer program product including commands which in the execution of the program by a computer cause it by carrying out step A of the method to determine an actual value progression, to encode same in the form of data and to store the encoded data, preferably in the form of a parts data set in relation to a uniquely identifiable moulding tool for a shaping machine in a storage medium.

In addition or alternatively the invention provides a computer program product including commands which in the execution of the program by a computer cause it using an actual value progression stored in the form of encoded data in a storage medium by carrying out step B) of the method to establish a target value progression for the at least one process parameter functioning as the setting variable.

In a shaping machine according to the invention, in particular an injection moulding machine, having a moulding tool, it is provided that the shaping machine has a computer or can be brought into data-transmitting communication with such, which is configured to carry out such a method according to the invention.

In an embodiment of the invention, the shaping machine in its first configuration and/or in its second configuration is in the form of a simulation simulatable by a computer and the operation of determining the actual value progression is effected using the simulation and a computer by a target value progression for the at least one process parameter functioning as the setting variable being so established by the computer that the actual value progression afforded by the simulation has the at least one selected property or the desired actual value progression itself ensues.

In an embodiment of the invention, the shaping machine in its first configuration and/or in its second configuration is in the form of a physically existing shaping machine and the operation of determining the actual value progression is effected using the physically existing shaping machine by a target value progression for the at least one process parameter functioning as the setting variable being so established by the computer that the actual value progression at the physically existing shaping machine has the at least one selected property or the desired actual value progression ensues.

In an embodiment of the invention, the shaping machines in the first and the second configuration use the identical or the same moulding tool in which at least one moulding is produced in the production cycle but are different from each other in relation to at least one of the features listed hereinafter:
  plasticizing unit of the shaping machine which serves to produce a moulding material for introduction into a moulding tool and/or to introduce it into the moulding tool, preferably a drive unit of the plasticising unit and properties of the screw, particularly preferably the diameter thereof,
  an injection unit which serves to introduce a moulding material into a moulding tool,
  a drive unit or electrical or hydraulic drive type,
  a closing unit, in particular for compression moulding processes,
  material used for the moulding material,
  differences in regard to the production tolerances,
  machine parametrization, preferably controller setting or increased injection pressure.

In an embodiment of the invention, the at least one process parameter of a production cycle, functioning as the setting variable, and the at least one selected variable which ensues when the shaping machine in a production cycle operates in accordance with the target value progression for the at least one process parameter functioning as the setting variable relate to a plasticising process and/or an injection process of the production cycle.

Different process parameters can be used as the setting variable (which is used for controlling actuators of the shaping machine in a closed-loop or open-loop control method) and/or as a selected variable.

In an embodiment of the invention, the at least one process parameter functioning as the setting variable and/or the at least one selected variable is or are selected from the list hereinafter:
  a time-dependent or travel-dependent profile of an injection speed of moulding material into a shaping tool,
  a time-dependent or travel-dependent profile of an injection volume of moulding material into a shaping tool,
  switchover point from a time-dependent or travel-dependent profile for an injection speed of moulding material into a shaping tool to a time-dependent pressure profile,
  profile of a holding pressure after filling of a shaping tool with moulding material,
  time-dependent or travel-dependent profile of a metering speed of a plasticising unit,
  time-dependent or travel-dependent profile of a dynamic pressure of a plasticising unit,
  time-dependent or travel-dependent profile of a closing movement of a closing unit, time-dependent or travel-dependent profile of an ejection movement of an ejection device.

In an embodiment of the invention, a portion-wise or complete progression in respect of the at least one selected variable is selected from the list hereinafter:
- progression of a pressure of the moulding material at least one selected position of the shaping machine, preferably avoiding peaks going beyond a predeterminable limit value,
- progression in a volume flow of moulding material into a shaping tool,
- progression in the speed during the holding pressure phase,
- flow front speed,
- mould internal pressure,
- metering speed of a plasticising unit,
- dynamic pressure of a plasticising unit,
- plasticising moment of a plasticising unit,
- closing speed and/or closing force and/or torque of a drive unit of a closing unit,
- ejection speed and/or ejection force and/or torque of a drive unit of an ejection device.

In an embodiment of the invention, the at least one selected property of the actual value progression for the at least one selected variable is selected from the list hereinafter:
- avoiding or limiting peaks in the actual value progression,
- limiting the first and/or a higher derivative of the actual value progression,
- predetermining reference points on the curve and associated tolerance ranges,
- minimum and maximum values in given process phases or at specific travel or time points,
- maximum required time for carrying out a movement or selected phases of the production cycle or the entire production cycle,
- maximum amount of material which is injected by way of holding pressure,
- portion-wise or complete appearance of a time-dependent or travel-dependent progression (for example presence or absence of a peak in a progression, possibly at a given location).

In a method according to the invention of open-loop or closed-loop control of a cyclically operating shaping machine, in particular an injection moulding machine, wherein a target value progression is predetermined for at least one process parameter of a production cycle of the cyclically operating shaping machine for open-loop or closed-loop control and an actual value progression for at least one variable ensues when in a production cycle the shaping machine operates in accordance with the target value progression for the at least one process parameter, a target value progression established in accordance with an embodiment of the method according to the invention is used as the target value progression, in order to
- display to an operator of the shaping machine how a target value progression is to be selected or a prevailing target value progression is to be altered so that the actual value progression for the at least one selected variable with the at least one selected property or the desired actual value progression itself ensues, or
- automatically set, open-loop control or closed-loop control the at least one process parameter by a computer.

A machine open-loop or closed-loop control unit is provided for open-loop and/or closed-loop control of actuators of the shaping machine and in particular open-loop and/or closed-loop control of the at least one process parameter.

That unit can be installed directly in the shaping machine or—at least in parts—arranged remotely therefrom and can be connected to the shaping machine by way of a data connection. The computer for carrying out a method according to the invention and/or a computer program product according to the invention can be provided in the machine open-loop or closed-loop control unit or separately therefrom. It can be for example in the cloud and can be brought into communication with the shaping machine, for example with a machine open-loop or closed-loop control unit of the shaping machine, by way of a data connection.

A visualization device can be provided for visualising the results of the method according to the invention, which device can either be installed directly in the shaping machine or can be arranged remotely therefrom and can be communicated with the shaping machine by way of a data connection.

The invention is used in relation to all variants and embodiments by way of example, preferably in a cyclically operating shaping machine in the form of an injection moulding machine, in particular a plastic injection moulding machine. The invention can be used in a machine pool of shaping machines.

An injection moulding machine has a closing unit having at least two mould mounting plates which are moveable relative to each other and to which there is mounted a moulding tool which can be opened and closed by the movement of the mould mounting plates and/or by a stroke movement independent thereof. A further unit of the injection moulding machine creates moulding melt (in the case of a plastic injection moulding machine the plasticising unit by plasticising plastic material) which by an injection ram (in a plastic injection moulding machine that is preferably formed by a plasticising screw used for plasticising the material) is injected into one or more cavities in the moulding tool, where the moulding melt hardens to form one or more mouldings.

Which process parameter can be used as the setting variable to obtain an actual value progression for at least one selected variable with a desired property or a desired actual value progression for the at least one selected variable itself can be ascertained on the basis of user inputs and/or expert knowledge, practical tests and/or calculations, in particular using machine learning.

An algorithm for carrying out the method according to the invention can be for example of the following configuration:

A plastic injection moulding machine is specified as an example of the shaping machine. By way of example, a progression in a pressure of the moulding material as from the switchover point (change from injection to holding pressure) is specified as the selected variable G. In that case (as the desired property E of the actual value progression of the selected variable) the overshoot of the pressure beyond the switchover pressure (pressure at the switchover time) after the switchover point is to be minimized in order to achieve as gentle a transition as possible in the pressure from the switchover pressure to the holding pressure level. In the case of position-defined switchover at the switchover point x=switchover that pressure increase would ensue in relation to the switchover pressure with the assumption by way of example of a constant holding pressure $p_{holding\ pressure}$ as:

$$\Delta p = \max(p(x > \text{switchover})) - p_{holding\ pressure}$$

In this case the setting variables are individual points in the speed $v_i$ of the screw in the injection movement at the position $x_i$.

The algorithm for carrying out the method according to the invention uses mathematical optimization and can resolve it after suitable formulation of the optimization problem by means of standard optimisation algorithms corresponding to the state of the art. By way of example gradient-free and gradient-based optimisation algorithms like NLP (LP, QP, SQP, . . . ), genetic algorithms and so forth can be named here.

The optimization variables which are combined in the optimization vector u are the individual speeds $v_1, v_2, \ldots v_n$ at travel points $x_1, x_2, \ldots x_n$ $$u^T = [v_1 v_2 \ldots ].$$

The quality function $J = (\Delta p)^2$ is minimised by means of an optimisation algorithm (for example one of the above-mentioned). That optimization can concern either only one production cycle or also a plurality of production cycles and can thereby take account of any process fluctuations.

Preferably the optimization result can be continuously improved by iterative execution of the optimisation or also the underlying models or signal descriptions can be continuously improved by adaptive matching during or after a production cycle.

In a further embodiment implementation of the production cycle can be effected by means of a simulation so that at the end of the optimization the quality function converges towards a minimum and the setting variable pairs $(v_i, x_i)$ are defined therewith.

It will be appreciated that the invention can also be used at the same time in relation to more than only one process parameter functioning as a setting variable and/or more than only one selected variable. Based on the foregoing embodiment, the setting variable to be varied in respect of the speeds can be enlarged by the switchover position x=switchover. In that way, the optimization vector u would give:

$$u^T = [v_1 v_2 \ldots v_n \text{ switchover}].$$

In addition, multi-criterial optimization problems can be selected in order jointly to minimize a plurality of target functions or target functionals (in each case as a desired property of a selected variable), like for example in order in a specific embodiment to minimize both the energy consumption $J = E^2$ and also the cycle time $J = t_{cyc}^2$. Minimizing the target variables selected here (selected variables G) "required energy" and "cycle time" is a contradiction whereby special optimisation algorithms have to be applied. Here, too, the algorithm for carrying out the method according to the invention uses mathematical optimization like for example "Weighted Sum", Pareto optimization etc which is known to the man skilled in the art and after suitable formulation of the optimisation problem can resolve same by standard optimization algorithms corresponding to the state of the art.

Visualization of the target value progression and/or the actual value progression can be provided for a user.

BRIEF DESCRIPTION OF THE DRAWINGS

The state of the art and the invention are discussed hereinafter with reference to the Figures in which.

DETAILED DESCRIPTION OF THE INVENTION

Figure 1:
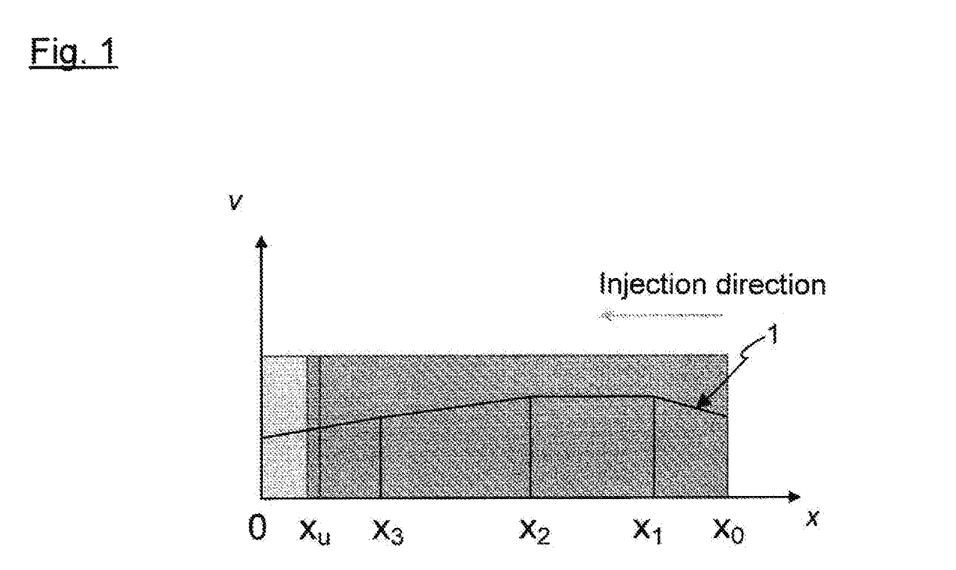
FIGS. 1 and 2 show the problems in the state of the art.

FIG. 1 shows by way of example an initial target value progression 1 which is predetermined by a user or at the factory for a process variable P functioning here as a setting variable $u_P$ "injection speed v" of a cyclically operating shaping machine 2, 2' in the form of the plastic injection moulding machine in accordance with the state of the art. At predetermined positions $x_0, x_1, x_2, x_3$ of an injection ram the injection speed v is changed to a given value, wherein at the position $x_U$ (switchover point) switching over from closed-loop speed control to closed-loop pressure control is effected.

Figure 2:
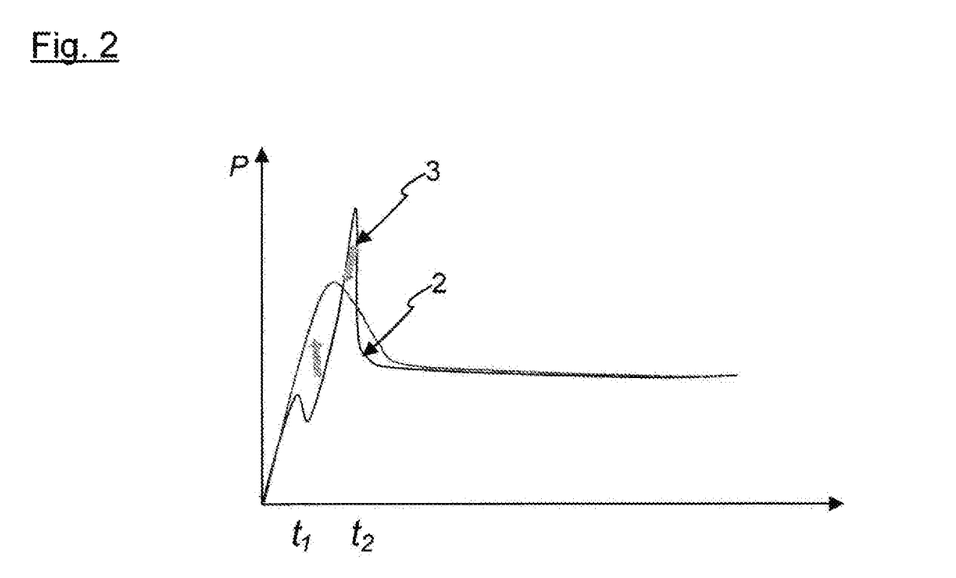

FIG. 2 shows the ensuing actual value progression 3 for a selected variable G in the form of the "injection pressure p". This actual value progression 3 does not have the desired property E in relation to "avoiding or limiting peaks in the actual value progression" as two pressure peaks can be seen at the times $t_1$ and $t_2$. In the state of the art the user now has to change the target value progression 1 for the injection speed v in such a way that the desired actual value progression (symbolised by the illustrated arrows) ensues, which no longer has the pressure peaks.

Figure 3:
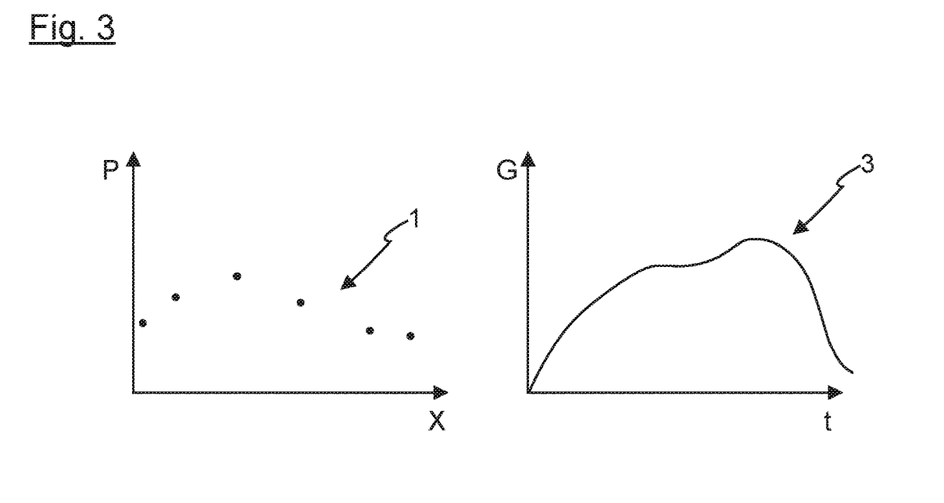
FIG. 3 shows a target value progression and a desired actual value progression.
Figure 6:
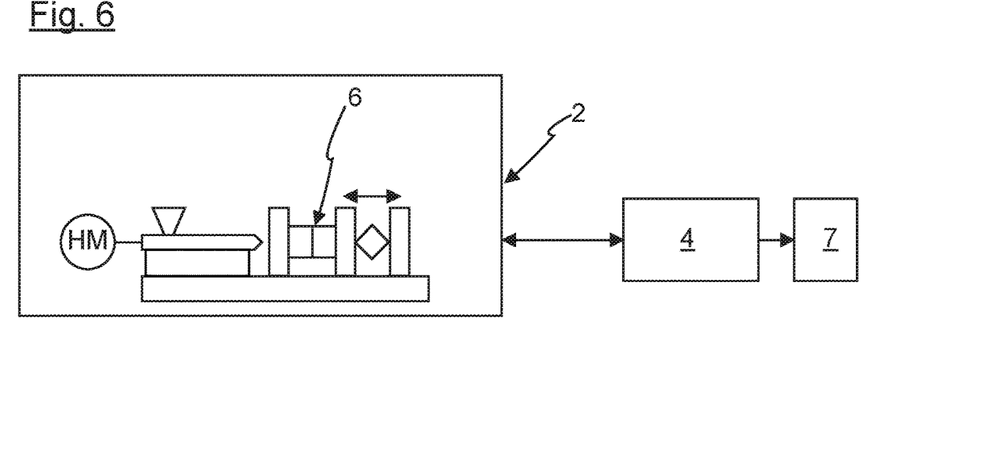
FIG. 6 shows a shaping machine according to the invention in a first configuration.

FIG. 3 shows by way of example a target value progression 1 for a process parameter P, functioning as a setting variable $u_P$, of a production cycle of a cyclically operating shaping machine 2, 2', in particular an injection moulding machine, in a first configuration (for example with a hydraulic drive unit HM for the injection ram of a plasticising unit of the shaping machine 2, 2'—see the diagrammatic view in FIG. 6), wherein there is an actual value progression 3 for at least one variable G if in a production cycle the shaping machine 2, 2' operates in accordance with the target value progression 1 for the at least one process parameter P functioning as a setting variable $u_P$. In this example the target value progression 1 is in the form of six presetting values for the process parameter P (which naturally is not essential to the invention, it would be possible to provide fewer or more presetting values—up to such a high number of presetting values that there is a continuous progression). The variable G which was measured or simulated in a virtual simulation is here in the form of a continuous actual value progression 3 (which naturally is not essential to the invention, fewer presetting values could be provided, like for example a discrete, that is to say sampled, progression).

The way in which, for the desired actual value progression 3 of the variable G, the associated target value progression for the process parameter P functioning as the setting variable $u_P$ can be ascertained has already been described. What is now essential is that the desired actual value progression 3 is encoded by a computer program product according to the invention in executing the program by a computer 4 in the form of data and the encoded data, preferably in the form of a parts data set in relation to a uniquely identifiable moulding tool 6 for a shaping machine 2, 2' are stored in a storage medium 7.

Figure 4:
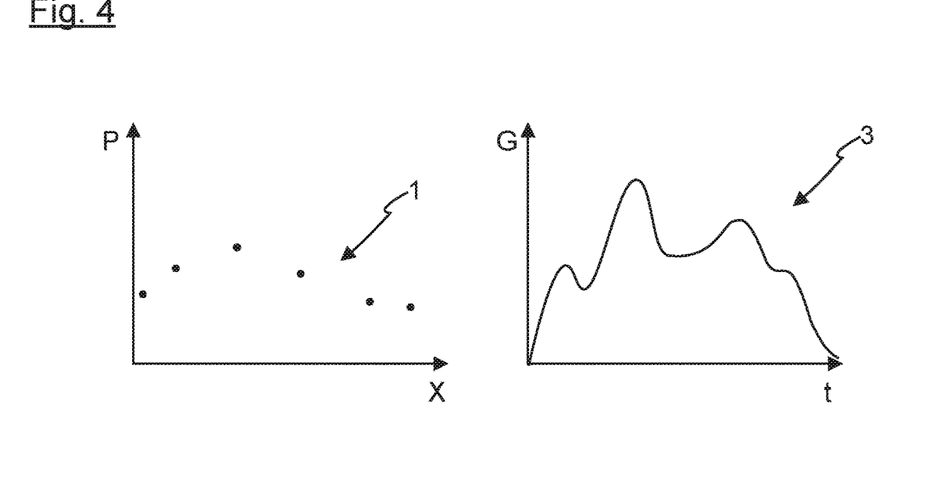
FIG. 4 shows an unwanted actual value progression occurring for the target value progression of FIG. 3 in a shaping machine involving a different configuration.
Figure 7:
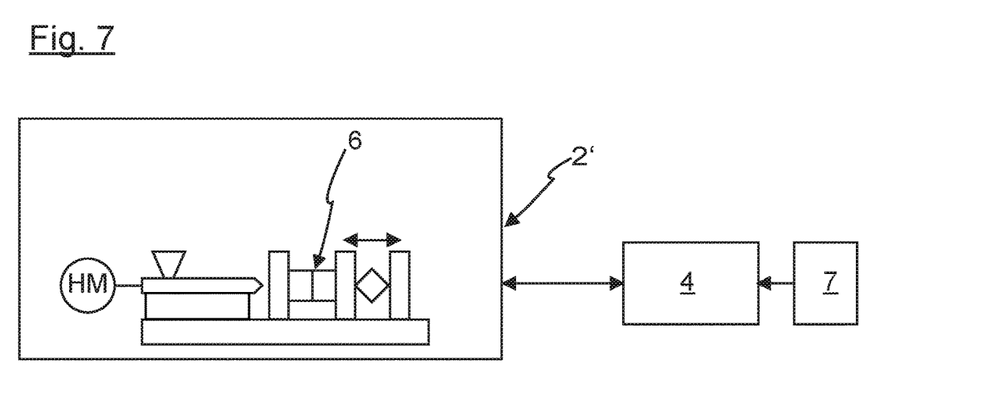
FIG. 7 shows a shaping machine according to the invention in a second configuration.

If now the same target value progression were simply selected for the process parameter P as in FIG. 3, for the identical or the same moulding tool 6 mounted in a shaping machine 2' of a second configuration (for example with an electrical drive unit EM for the injection ram of a plasticising unit of the shaping machine 2', but otherwise of the same structure with the shaping machine 2 in the first configuration—see the diagrammatic view in FIG. 7), then by way of example that would give the unwanted actual value progression 3 shown in FIG. 4, with a large number of peaks.

Figure 5:
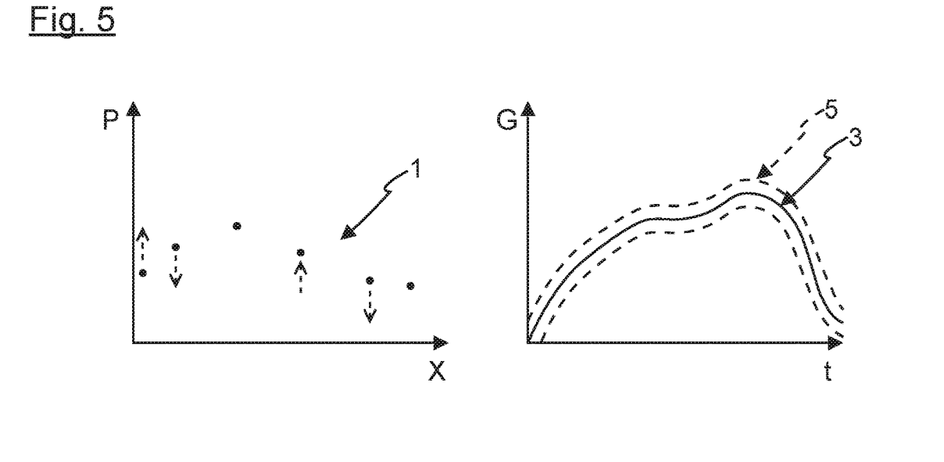
FIG. 5 shows the required adaptation of the target value progression so that the desired actual value progression ensues within a predetermined tolerance range.

Using a computer program product according to the invention including commands which in the execution of the program by a computer 4 cause it to establish a target value progression 1 for the at least one process parameter P functioning as the setting variable $u_P$, using an actual value progression 3 stored in the form of encoded data in a storage medium 7, by carrying out step B of the method, then the computer can make the required modification in the target value progression 1, as is diagrammatically shown in FIG. 5. In that respect the arrows show the displacements to the new presetting values which are shown as crosses. In that respect it is not absolutely necessary for the actual value progression 3 which was produced in relation to the shaping machine 2 of the first configuration to be reproduced identically, but it may be sufficient if the actual value progression 3 is within a predetermined or predeterminable tolerance range.

Figure 8:
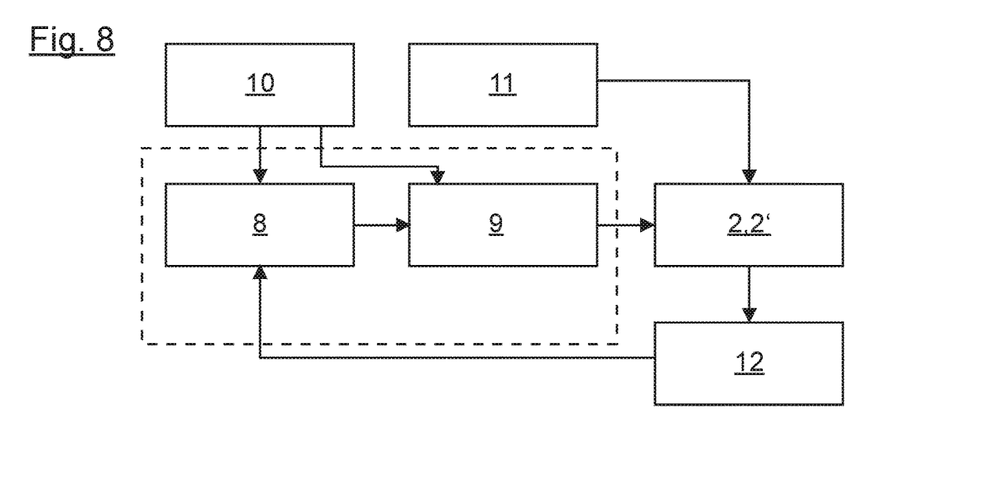
FIG. 8 shows a diagrammatic representation of the method according to the invention of ascertaining a target value progression and providing for open-loop or closed-loop control of a shaping machine with that target value progression.

FIG. 8 shows a diagrammatic view of the method according to the invention of ascertaining a target value progression 1 and providing for open-loop or closed-loop control of a shaping machine 2, 2' with that target value progression 1. The following are provided:

- a module 8 for calculating a deviation of the selected property E of the variable G of the measured actual value progression 3 or the measured actual value progression 3 itself from a desired actual value progression 3,
- a module 9 for adaptation of the target value progression 1 for the process parameter P,
- a module 10 for presetting a selected property E of the variable G of the actual value progression 3 or the actual value progression 3 itself for the process parameter P,
- a module 11 for presetting an initial value for the setting variable $u_P$, and
- a measuring device 12 for measuring the actual value progression 3.

A selected desired property E of the variable G can be preset by a user by way of the module 10. Alternatively it would also be possible to directly preset a desired actual value progression 3 by way of that module 8.

Initial values for the setting variable $u_P$ can be preset by a user or at the factory by way of the module 11. At least one production cycle of the shaping machine 2, 2' is implemented with the values preset by way of the module 11 and the ensuing actual value progression 3 is measured by way of the measuring device 12 and passed to the module 8.

That module calculates—for example with the discussed algorithm—a deviation in the selected property E of the variable G of the measured actual value progression 3 or the measured actual value progression 3 itself from a desired actual value progression 3 and by way of the module 9 implements adaptation of the target value progression 1 for the process parameter P (for the setting variable $u_P$), that is to say setting to a new target value progression 1.

If necessary that process can be iteratively repeated until the deviation of the selected property E of the variable G of the measured actual value progression 3 or the desired actual value progression 3 itself from a desired actual value progression 3 is within a predetermined or predeterminable tolerance range 5. The tolerance range 5—as shown here by way of example—can be symmetrical around the desired actual value progression 3, but that is not absolutely necessary, an asymmetric configuration can possibly also be selected.

LIST OF REFERENCES

1 target value progression for a process parameter P functioning as a setting variable
2, 2' cyclically operating shaping machine
3 actual value progression for a variable G
4 computer
5 tolerance range
6 moulding tool
7 storage medium
8 module for calculating a deviation in the selected property E of the variable G of the measured actual value progression or the measured actual value progression itself from a desired actual value progression
8 module for adaptation of the target value progression for the process parameter P
9 module for presetting a selected property E of the variable G target value progression for the process parameter P
10 module for presetting an initial value for the setting variable $u_P$
11 measuring device for measuring the actual value progression
P process parameter
G selected variable
E desired property of the actual value progression for the selected variable
$u_P$ setting variable for the process parameter
v injection speed
$x_0, x_1, x_2, x_3$ predetermined positions of an injection ram
$x_U$ switchover point
p pressure of the moulding material
$t_1, t_2$ moments in time

The invention claimed is:

1. A method of establishing a first target value progression for at least one process parameter functioning as a setting variable of a production cycle of a cyclically operating first shaping machine, wherein an actual value progression for at least one selected variable ensues when the first shaping machine operates in a production cycle in accordance with the first target value progression for the at least one process parameter functioning as the setting variable, wherein at least one desired property of the actual value progression for the at least one selected variable or a desired actual value progression itself is predetermined, and a second target value progression for the at least one process parameter functioning as the setting variable is so established by a computer that an actual value progression for the at least one selected variable with the at least one desired property or the desired actual value progression itself ensues, the method comprising:

with the first shaping machine in a first configuration in at least one production cycle, establishing the second target value progression for the at least one process parameter functioning as the setting variable such that an actual value progression for the at least one selected variable has the at least one desired property, or such that the desired actual value progression itself ensues; and in a second shaping machine in a second configuration different from the first configuration, adapting the actual value progression occurring in relation to the first configuration as a reference value progression for the at least one selected variable, and establishing a third target value progression by the computer for the at least one process parameter functioning as the setting variable such that the reference value progression ensues as the actual value progression with the at least one desired property, or such that the desired actual value progression itself ensues, when the second shaping machine in the second configuration operates in a production cycle in accordance with the established third target value progression for the at least one process parameter functioning as the setting variable.

2. The method according to claim 1, wherein the first shaping machine in the first configuration and/or the second shaping machine in the second configuration is in the form of a simulation simulatable by a computer, and the operation of determining the actual value progression is effected using the simulation and a computer by a corresponding one of the established second and third target value progressions for the at least one process parameter functioning as the setting variable such that the actual value progression afforded by the simulation has the at least one desired property, or such that the desired actual value progression itself ensues.

3. The method according to claim 1, wherein the first shaping machine in the first configuration and/or the second shaping machine in the second configuration is in the form of a physically existing shaping machine and the operation of determining the actual value progression is effected using the physically existing shaping machine by a corresponding one of the established second and third target value progressions for the at least one process parameter functioning as the setting variable such that the actual value progression at the physically existing shaping machine has the at least one desired property or corresponds to the desired actual value progression.

4. The method according to claim 1, wherein the first and second shaping machines in the first and the second configurations use an identical moulding tool in which at least one moulding is produced in the production cycle, and wherein the shaping machines are different from each other in relation to at least one of:
  a plasticizing unit which serves to produce a moulding material for introduction into the moulding tool and/or to introduce the moulding material into the moulding tool;
  an injection unit which serves to introduce a moulding material into the moulding tool;
  a drive unit or electrical or hydraulic drive type;
  a closing unit;
  a material used for the moulding material;
  production tolerances; and
  machine parametrisation.

5. The method according to claim 1, wherein the at least one process parameter of a production cycle, functioning as the setting variable, and the at least one selected variable which ensues when one of the first and second shaping machines in a production cycle operates in accordance with a corresponding one of the established second and third target value progressions for the at least one process parameter functioning as the setting variable relate to a plasticising process and/or an injection process of the production cycle.

6. The method according to claim 1, wherein the at least one process parameter functioning as the setting variable and/or the at least one selected variable is or are selected from the group consisting of:
  a time-dependent or travel-dependent profile of an injection speed of moulding material into a shaping tool;
  a time-dependent or travel-dependent profile of an injection volume of moulding material into a shaping tool,
  a switchover point from a time-dependent or travel-dependent profile for an injection speed of moulding material into a shaping tool to a time-dependent pressure profile;
  a profile of a holding pressure after filling of a shaping tool with moulding material;
  a time-dependent or travel-dependent profile of a metering speed of a plasticising unit;
  a time-dependent or travel-dependent profile of a dynamic pressure of a plasticising unit;
  a time-dependent or travel-dependent profile of a closing movement of a closing unit; and
  a time-dependent or travel-dependent profile of an ejection movement of an ejection device.

7. The method according to claim 5, wherein a portion-wise or complete progression with respect to the at least one selected variable is selected from the group consisting of:
  a progression of a pressure of moulding material at least one selected position of one of the first and second shaping machines;
  a progression in a volume flow of moulding material into a shaping tool;
  a progression in speed during a holding pressure phase;
  a flow front speed;
  a mould internal pressure;
  a metering speed of a plasticising unit;
  a dynamic pressure of a plasticising unit;
  a plasticizing moment of a plasticising unit;
  a closing speed and/or closing force and/or torque of a drive unit of a closing unit; and
  an ejection speed and/or ejection force and/or torque of a drive unit of an ejection device.

8. The method according to claim 1, wherein the at least one desired property of the actual value progression for the at least one selected variable is selected from the group consisting of:
  avoiding or limiting peaks in the actual value progression;
  limiting a first and/or a higher derivative of the actual value progression;
  predetermining reference points on a curve and associated tolerance ranges;
  minimum and maximum values in given process phases or at specific travel or time points;
  a maximum required time for carrying out a movement or selected phases of the production cycle or the entire production cycle;
  a maximum amount of material which is injected by way of holding pressure; and
  portion-wise or complete appearance of a time-dependent or travel-dependent progression.

9. A method of open-loop or closed-loop control of a cyclically operating first shaping machine, wherein a first target value progression is predetermined for at least one process parameter of a production cycle of the cyclically operating first shaping machine for open-loop or closed-loop control, wherein an actual value progression for at least one selected variable ensues when the first shaping machine operates in a production cycle in accordance with the first target value progression for the at least one process parameter, and wherein at least one desired property of the actual value progression for the at least one selected variable or a desired actual value progression itself is predetermined, the method comprising:
- with the first shaping machine in a first configuration in at least one production cycle, establishing a second target value progression for the at least one process parameter functioning as the setting variable such that an actual value progression for the at least one selected variable has the at least one desired property, or such that the desired actual value progression itself ensues;
- in a second shaping machine in a second configuration different from the first configuration, adapting the actual value progression occurring in relation to the first configuration as a reference value progression for the at least one selected variable, and establishing a third target value progression by the computer for the at least one process parameter functioning as the setting variable such that the reference value progression ensues as the actual value progression with the at least one desired property, or such that the desired actual value progression itself ensues, when the second shaping machine in the second configuration operates in a production cycle in accordance with the established third target value progression for the at least one process parameter functioning as the setting variable; and
- using one of the established target value progressions as the third target value progression, in order to
  - display to an operator of one of the first and second shaping machines how a target value progression is to be selected or a prevailing target value progression is to be altered so that the actual value progression for the at least one selected variable with the at least one desired property or the desired actual value progression itself ensues, or
  - automatically set, open-loop control or closed-loop control the at least one process parameter by a computer.

10. A non-transitory computer readable recording medium having stored thereon a computer program product including commands which in execution of the program by a computer cause it to carry out:
- establishing a first target value progression for at least one process parameter functioning as a setting variable of a production cycle of a cyclically operating first shaping machine, wherein an actual value progression for at least one selected variable ensues when the first shaping machine operates in a production cycle in accordance with the first target value progression for the at least one process parameter functioning as the setting variable, wherein at least one desired property of the actual value progression for the at least one selected variable or a desired actual value progression itself is predetermined, and a second target value progression for the at least one process parameter functioning as the setting variable is so established by the computer that an actual value progression for the at least one selected variable with the at least one desired property or the desired actual value progression itself ensues;
- with the first shaping machine in a first configuration in at least one production cycle, establishing the second target value progression for the at least one process parameter functioning as the setting variable such that an actual value progression for the at least one selected variable has the at least one desired property, or such that the desired actual value progression itself ensues; and
- in a second shaping machine in a second configuration different from the first configuration, adapting the actual value progression occurring in relation to the first configuration as a reference value progression for the at least one selected variable, and establishing a third target value progression by the computer for the at least one process parameter functioning as the setting variable such that the reference value progression ensues as the actual value progression with the at least one desired property, or such that the desired actual value progression itself ensues, when the second shaping machine in the second configuration operates in a production cycle in accordance with the established third target value progression for the at least one process parameter functioning as the setting variable.

11. The computer program product according to claim 10, wherein the computer program product includes commands which in the execution of the program by a computer cause it to, by the establishing of the second target value progression with the first shaping machine in the first configuration, carry out:
- determining an actual value progression;
- encoding the determined actual value progression in the form of data; and
- storing the encoded data in a storage medium.

12. The computer program product according to claim 11, wherein the computer program product includes commands which in the execution of the program by a computer cause it to carry out, in the second shaping machine in the second configuration,
- the adapting of the actual value progression by using the actual value progression stored in the storage medium as the reference value progression for the at least one selected variable, and the establishing of the third target value progression for the at least one process parameter functioning as the setting variable such that the reference value progression ensues as the actual value progression with the at least one desired property, or such that the desired actual value progression itself ensues, when the second shaping machine in the second configuration operates in a production cycle in accordance with the established third target value progression for the at least one process parameter functioning as the setting variable.

13. A cyclically operating shaping machine having a moulding tool, wherein the shaping machine has a computer or can be brought into data-transmitting communication with a computer, the shaping machine comprising a first shaping machine and a second shaping machine, the first shaping machine being configured to
- establish a first target value progression for at least one process parameter functioning as a setting variable of a production cycle of the first shaping machine, wherein an actual value progression for at least one selected variable ensues when the first shaping machine operates in a production cycle in accordance with the first target value progression for the at least one process parameter functioning as the setting variable, wherein at least one desired property of the actual value progression for the at least one selected variable or a desired actual value progression itself is predetermined, and a second target value progression for the at least one process parameter functioning as the setting variable is so established by the computer that an actual value progression for the at least one selected variable with the at least one desired property or the desired actual value progression itself ensues,
wherein the first shaping machine is further configured to, in a first configuration in at least one production cycle, establish the second target value progression for the at least one process parameter functioning as the setting variable such that an actual value progression for the at least one selected variable has the at least one desired property, or such that the desired actual value progression itself ensues, and
wherein the second shaping machine is configured to, in a second configuration different from the first configuration, adapt the actual value progression occurring in relation to the first configuration as a reference value progression for the at least one selected variable, and establish a third target value progression by the computer for the at least one process parameter functioning as the setting variable such that the reference value progression ensues as the actual value progression with the at least one desired property, or such that the desired actual value progression itself ensues, when the second shaping machine in the second configuration operates in a production cycle in accordance with the established third target value progression for the at least one process parameter functioning as the setting variable.

14. The method according to claim 1, wherein at least one of the first and second shaping machines is an injection moulding machine.

15. The method according to claim 1, wherein the at least one selected variable is different from the at least one process parameter functioning as the setting variable.

16. The method according to claim 1, wherein the actual value progression for the at least one selected variable with the at least one desired property or the desired actual value progression itself ensues within a predeterminable or predetermined tolerance range.

17. The method according to claim 1, wherein the reference value progression ensues as the actual value progression with the at least one desired property, or such that the desired actual value progression itself ensues, within a predeterminable or predetermined tolerance range.

18. The method according to claim 4, wherein a difference in the plasticising unit includes a difference in a drive unit of the plasticising unit and properties of a screw of the plasticising unit.

19. The method according to claim 18, wherein the properties of the screw include a diameter of the screw.

20. The method according to claim 4, wherein a difference in the closing unit includes a difference in compression moulding processes of the closing unit.

21. The method according to claim 4, wherein a difference in machine parametrisation includes a difference in a controller setting or an increased injection pressure.

22. The method according to claim 7, wherein the progression of the pressure of the moulding material at the at least one selected position of the one of the first and second shaping machines includes avoiding peaks going beyond a predeterminable limit value.

23. The method according to claim 9, wherein at least one of the first and second shaping machines is an injection moulding machine.

24. The computer program product according to claim 11, wherein the encoded data stored in the storage medium is in the form of a parts data set in relation to a uniquely identifiable moulding tool for a shaping machine.

* * * * *